US012519613B2

(12) United States Patent
Lee et al.

(10) Patent No.: US 12,519,613 B2
(45) Date of Patent: Jan. 6, 2026

(54) APPARATUS FOR CALCULATING MATRIX MULTIPLICATION OF HOMOMORPHIC ENCRYPTION AND METHOD THEREOF

(71) Applicant: CRYPTO LAB INC., Seoul (KR)

(72) Inventors: Seewoo Lee, Chungju-si (KR); Jung Woo Kim, Seoul (KR); Junbum Shin, Suwon-si (KR)

(73) Assignee: CRYPTO LAB INC., Seoul (KR)

( * ) Notice: Subject to any disclaimer, the term of this patent is extended or adjusted under 35 U.S.C. 154(b) by 125 days.

(21) Appl. No.: 18/502,539

(22) Filed: Nov. 6, 2023

(65) Prior Publication Data

US 2024/0163076 A1 May 16, 2024

(30) Foreign Application Priority Data

Nov. 7, 2022 (KR) .................. 10-2022-0147388
Nov. 2, 2023 (KR) .................. 10-2023-0150034

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ..... H04L 9/008; H04L 9/0618; H04L 9/0861; G06F 17/16
See application file for complete search history.

(56) References Cited

U.S. PATENT DOCUMENTS

| 8,913,742 | B2 * | 12/2014 | Takashima | ............ H04L 9/0869 380/44 |
| 8,938,623 | B2 * | 1/2015 | Takashima | ................ H04L 9/08 713/176 |
| 9,197,637 | B2 * | 11/2015 | Sy | ....................... H04L 63/0861 |
| 9,973,334 | B2 * | 5/2018 | Hibshoosh | ............ H04L 9/0838 |
| 12,045,364 | B1 * | 7/2024 | Trepetin | .............. H04L 63/0428 |

(Continued)

OTHER PUBLICATIONS

Crockett, E., "A Low-Depth Homomorphic Circuit for Logistic Regression Model Training" Amazon Web Services. WAHC 2020. 33 pages.

(Continued)

*Primary Examiner* — Hosuk Song
(74) *Attorney, Agent, or Firm* — Steinfl + Bruno LLP

(57) ABSTRACT

An operation apparatus performing matrix multiplication of a homomorphic encryption is disclosed. The operation apparatus includes a memory configured to store at least one instruction and a plurality of homomorphic ciphertexts, and a processor configured to execute the at least one instruction. The processor is configured to generate first matrix data having a row of a predetermined size and a column of a predetermined size using the plurality of homomorphic ciphertexts, generate a plurality of third matrix data having a row which is the size of the predetermined column and the column of the predetermined size by arranging second matrix data having a row which is 1/n size of the predetermined column and the column of the predetermined size sequentially n-times, and perform a homomorphic multiplication operation between same rows and same columns using the first matrix data and the generated respective third matrix data.

13 Claims, 16 Drawing Sheets

(56) References Cited

U.S. PATENT DOCUMENTS

| | | | |
|---|---|---|---|
| 2017/0250796 A1* | 8/2017 | Samid | H04L 9/0838 |
| 2024/0137206 A1* | 4/2024 | Pan | H04L 9/008 |
| 2024/0163076 A1* | 5/2024 | Lee | H04L 9/0618 |

OTHER PUBLICATIONS

Huang, Z. et al., "More Efficient Secure Matrix Multiplication for Unbalanced Recommender Systems" IEEE Transactions on Dependable and Secure Computing, vol. 20, No. 1. Publication Date: Dec. 29, 2021. pp. 551-562. 12 pages.

Jiang, X. et al., "Secure Outsourced Matrix Computation and Application to Neural Networks" University of Texas, Health Science Center at Houston, USA. Sep. 4, 2019. 23 pages.

Jin, C. et al., Secure Transfer Learning for Machine Fault Diagnosis under Different Operating Conditions. Institute for Infocomm Research, A*STAR, Singapore. Jan. 2020. 20 pages.

* cited by examiner

FIG. 4

| $a_{00}$ | $a_{01}$ | $a_{02}$ | 0 |
|---|---|---|---|
| $a_{10}$ | $a_{11}$ | $a_{12}$ | 0 |
| $a_{20}$ | $a_{21}$ | $a_{22}$ | 0 |
| 0 | 0 | 0 | 0 |

Algorithm 1 DiagABT: Homomorphic evaluation of $tAB^\mathsf{T}$
---
Input: $\langle A \rangle, \langle \overline{B} \rangle$, for $A \in \mathbb{R}^{a \times b}, B \in \mathbb{R}^{c \times b}, 1 < c \leq s_0$, and $t \in \mathbb{R}$
Output: $\langle t A \overline{B}^\mathsf{T} \rangle$ 1: $B_{\text{cplx}} = \langle \overline{B} \rangle + \sqrt{-1}\, \text{RotUp}(\langle \overline{B} \rangle, c/2)$
2: for $0 \leq k < \frac{c}{2}$ do
3: $\quad B_k = \text{RotUp}(B_{\text{cplx}}, k)$
4: $\quad R_k = \langle A \rangle \odot B_k$
5: $\quad R_k = \text{SumCols}(R_k)$
6: $\quad R_k = R_k \odot t M_{\text{cplx}}^{(k,c)}$
7: end for
8: $X = \sum_{0 \leq k < c/2} R_k$
9: $\langle t A \overline{B}^\mathsf{T} \rangle = X + \text{Conj}(X)$
---

FIG. 8

Algorithm 2 DiagATB: Homomorphic evaluation of $t A^T B$

Input: $(\overline{A}), (B)$, for $A \in \mathbb{R}^{a \times c}, B \in \mathbb{R}^{a \times b}$, and $t \in \mathbb{R}$
Output: $(t\overline{A}^T B)$ 1: $\overline{A}_{\text{cplx}} = (\overline{A}) + \sqrt{-1}\,\text{RotLeft}((\overline{A}), c/2)$
2: for $0 \leq k < \frac{c}{2}$ do
3:    if $\text{level}(A) < \text{level}(B)$ then
4:       $A_k = \text{Lrot}(\overline{A}_{\text{cplx}}, k)$
5:       $B_k = \text{PRotUp}((B), k)$
6:       $R_k = A_k \odot B_k$
7:    else
8:       $A_k = \text{RotLeft}(\overline{A}_{\text{cplx}}, k)$
9:       $R_k = A_k \odot (B)$
10:    end if
11:    $R_k = \text{SumRows}(R_k)$
12:    $R_k = R_k \odot t M_{\text{cplx}}^{(-k, a)}$
13: end for
14: $X = \sum_{0 \leq k < b/2} R_k$
15: $(t\overline{A}^T B) = X + \text{Conj}(X)$

Algorithm 3 RotLeft($\langle A \rangle, k$)

---

Input: $\langle A \rangle$ where $A \in \mathbb{R}^{a \times s_1}, 0 \leq k < s_1$
Output: RotLeft($\langle A \rangle, k$)
 1: $D_k = (d_{ij})$ where
$$d_{ij} = \begin{cases} 1 & 0 \leq j < s_1 - k \\ 0 & \text{otherwise} \end{cases}$$
 2: $A_1 = \text{Lrot}(\langle A \rangle, k)$
 3: $A_2 = A_1 \odot \langle D_k \rangle$
 4: RotLeft($\langle A \rangle, k$) = $A_2 + \text{Rrot}(A_1 - A_2, s_1)$

Algorithm 4 $\text{PRotUp}(B, k)$

Input: $(B)$ for $B \in \mathbb{R}^{a \times b}, 0 \leq k < s_1$
Output: $\text{PRotUp}(B, k)$ 1: $D_k = (d_{ij})$ where $$d_{ij} = \begin{cases} 1 & 0 \leq j < s_1 - k \\ 0 & \text{otherwise} \end{cases}$$

2: $B' = (B) \odot (D_k)$
3: $\text{PRotUp}(B, k) = B' + \text{RotUp}((B) - B', 1)$

APPARATUS FOR CALCULATING MATRIX MULTIPLICATION OF HOMOMORPHIC ENCRYPTION AND METHOD THEREOF

TECHNICAL FIELD

The disclosure relates to an apparatus for calculating matrix multiplication of homomorphic encryption and a method thereof, and more particularly, to an operation apparatus capable of effectively performing matrix multiplication in homomorphic encryption and a method thereof.

BACKGROUND ART

With developments in communication technology and as supply of electronic apparatuses become more active, efforts to maintain communication security between electronic apparatuses are being continuously carried out. Accordingly, encryption/decryption technologies are being used in most communication environments.

When a message encrypted by encryption technology is transferred to an opposite party, the opposite party has to perform decryption to use the message. In this case, the opposite party may waste resources and time in a process of decrypting encrypted data. In addition, if a third party hacking is carried out while the opposite party temporarily decrypted the message for an operation, there has been a problem of the message being easily leaked to a third party. To solve the above-described problem, a homomorphic encryption method is being researched.

Homomorphic encryption (HE) is a cryptosystem which can operate data even in a ciphertext state, can be used for the purpose of storing private information safely protected in an external medium or for calculating, and is an encryption method capable of privacy-preserving machine learning.

An operation result which used the ciphertexts in the homomorphic encryption may become a new ciphertext, and a plaintext obtained by decrypting thereof may be same as the operation result of original data prior to encryption. That is, because the homomorphic encryption can perform additions and multiplications of data which is encrypted without a decryption process, a client may delegate calculation to an untrusted cloud server by utilizing homomorphic encryption, transmit input data in an encrypted state to a server, and perform all calculations without there being any additional queries.

DISCLOSURE

Technical Solution

According to one or more embodiments, an operation apparatus includes a memory configured to store at least one instruction and a plurality of homomorphic ciphertexts, and a processor configured to perform a homomorphic matrix multiplication operation on the plurality of homomorphic ciphertexts by executing the at least one instruction. The processor is configured to generate first matrix data having a row of a predetermined size and a column of a predetermined size using the plurality of homomorphic ciphertexts, and generate second matrix data having a row which is 1/n size of the predetermined column and the column of the predetermined size.

The processor is configured to generate a plurality of third matrix data having a row which is the size of the predetermined column and the column of the predetermined size by arranging a plurality of rows of the second matrix data sequentially in a predetermined row order n-times, generate a plurality of fourth matrix data performed with a homomorphic multiplication operation between same rows and same columns using the first matrix data and the generated respective third matrix data, generate a plurality of fifth matrix data having data in which respective column values in a row are homomorphically added with a plurality of column values of the corresponding row in a row basis of the respective fourth matrix data, and generate a matrix multiplication operation result of the first matrix and the second matrix by applying a predetermined mask to the generated respective fifth matrix data.

According to one or more embodiments, an operation apparatus includes a memory configured to store at least one instruction and a plurality of homomorphic ciphertexts, and a processor configured to perform a homomorphic matrix multiplication operation on the plurality of homomorphic ciphertexts by executing the at least one instruction. The processor is configured to generate first matrix data having a row of a predetermined size and a column of a predetermined size using the plurality of homomorphic ciphertexts, and generate second matrix data having a row of the predetermined size and a column which is 1/n size of the predetermined row.

The processor is configured to generate a plurality of third matrix data having the row of the predetermined size and the column of the predetermined size by arranging a plurality of columns of the second matrix data sequentially in a predetermined column order n-times, generate a plurality of fourth matrix data performed with a homomorphic multiplication operation between same rows and same columns using the generated respective third matrix data and the first matrix data, generate a plurality of fifth matrix data having data in which respective row values in a column are homomorphically added with a plurality of row values of the corresponding column in a column basis of the respective fourth matrix data, and generate a matrix multiplication operation result of the first matrix and the second matrix by applying a predetermined mask to the generated respective fifth matrix data.

According to one or more embodiments, an operation method for performing a matrix multiplication of a homomorphic encryption includes receiving input of a plurality of homomorphic ciphertexts, performing a homomorphic matrix multiplication operation on the plurality of homomorphic ciphertexts, and outputting the operation result.

Meanwhile, the performing the homomorphic matrix multiplication operation includes generating first matrix data having a row of a predetermined size and a column of a predetermined size using the plurality of homomorphic ciphertexts, generating second matrix data having a row which is 1/n size of the predetermined column and the column of the predetermined size, and generating a plurality of third matrix data having a row which is the size of the predetermined column and a column of the predetermined size by arranging a plurality of rows of the second matrix data sequentially in a predetermined row order n-times.

In addition, the performing the homomorphic matrix multiplication operation includes generating a plurality of fourth matrix data performed with a homomorphic multiplication operation between same rows and same columns using the first matrix data and the generated respective third matrix data, generating a plurality of fifth matrix data having data in which respective column values in a row are homomorphically added with a plurality of column values of the corresponding row in a row basis of the respective fourth matrix data, and generating a matrix multiplication operation result of the first matrix and the second matrix by applying a predetermined mask to the generated respective fifth matrix data.

According to one or more embodiments, an operation method for performing a matrix multiplication of a homomorphic encryption includes receiving input of a plurality of homomorphic ciphertexts, performing a homomorphic matrix multiplication operation on the plurality of homomorphic ciphertexts, and outputting the operation result.

Meanwhile, the performing the homomorphic matrix multiplication operation includes generating first matrix data having a row of a predetermined size and a column of a predetermined size using the plurality of homomorphic ciphertexts, generating second matrix data having the row of the predetermined size and a column which is 1/n size of the predetermined row, and generating a plurality of third matrix data having the row of the predetermined size and the column of the predetermined size by arranging a plurality of columns of the second matrix data sequentially in a predetermined column order n-times.

In addition, the performing the homomorphic matrix multiplication operation includes generating a plurality of fourth matrix data performed with a homomorphic multiplication operation between same rows and same columns using the generated respective third matrix data and the first matrix data, generating a plurality of fifth matrix data having data in which respective row values in a column are homomorphically added with a plurality of row values of the corresponding column in a column basis of the respective fourth matrix data, and generating a matrix multiplication operation result of the first matrix and the second matrix by applying a predetermined mask to the generated respective fifth matrix data.

DESCRIPTION OF DRAWINGS

FIG. 4 is a diagram illustrating an encoding matrix of a single block according to one or more embodiments of the disclosure;

FIG. 6 is a diagram illustrating a DiagABT according to one or more embodiments of the disclosure;

FIG. 8 is a diagram illustrating a DiagATB according to one or more embodiments of the disclosure;

FIG. 9 is a diagram illustrating a RotLeft operation shown in FIG. 7 and FIG. 8;

FIG. 10 is a diagram illustrating a PRotUp operation according to one or more embodiments of the disclosure;

DETAILED DESCRIPTION OF EXEMPLARY EMBODIMENTS

Figure 1:
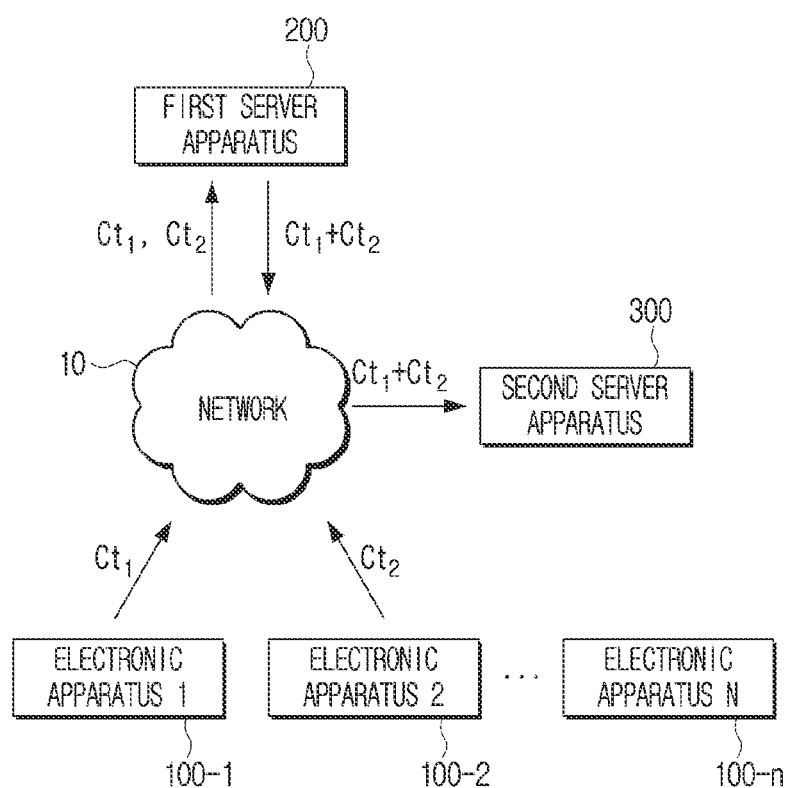
FIG. 1 is a diagram illustrating a structure of a network system according to one or more embodiments of the disclosure.

The disclosure will be described in detail below with reference to the accompanying drawings. A data transmission process in the disclosure may be applied with encryption and/or decryption according to necessity, and expressions describing the data transmission process in the disclosure and in the appended claims are to be interpreted as including both encryption and decryption even when separately indicated. In the disclosure, expressions in the form of "transmit (transfer) from A to B" or "receiving from B by A" may include another medium being included therebetween and being transmitted (transferred) or received, and may not necessarily mean being directly transmitted (transferred) or received from A to B only.

In describing the disclosure, the order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step. Further, in the disclosure, expressions such as "A or B" may not only refer to any one of A and B selectively, but also may be defined as meaning including both A and B. In addition, the term "include" in the disclosure may have a comprehensive meaning as further including another element in addition to the elements listed as included.

In the disclosure, only the essential elements necessary in describing the disclosure have been described, and elements not related to the nature of the disclosure have been omitted. Further, the disclosure is not to be construed in an exclusive sense including only the recited elements, but is to be interpreted in a non-exclusive sense where other elements may be included.

Further, in the disclosure, the term "value" may be defined as a concept that not only includes a scalar value, but also a vector value, and a polynomial form.

Mathematical operations and computations in each step of the disclosure, which will be described below, may be implemented as a computer operation by a publically known coding method to perform the corresponding operation or computation and/or a coding appropriately designed for the disclosure.

Specific equations described below are examples described from among several possible alternatives, and the scope of protection of the disclosure is not be interpreted as being limited to the equations described herein.

For convenience of description, the following notations will be used in the disclosure.

$s_1, s_2 \in R$: $s_1, s_2$ are respective elements belonging to R set.

mod(q): Perform modular operation with q element $\lceil \cdot \rceil$: Perform round up of an internal value Various embodiments of the disclosure will be described in detail below using the accompanied drawings.

FIG. 1 is a diagram illustrating a structure of a network system according to one or more embodiments of the disclosure.

Referring to FIG. 1, the network system may include a plurality of electronic apparatuses 100-1 to 100-n, a first server apparatus 200, and a second server apparatus 300, and each of the configurations may be interconnected through a network 10.

The network 10 may be implemented as a wired or wireless communication network in various forms, a broadcast communication network, an optical communication network, a cloud network, and the like, and each of the apparatuses may be connected through methods such as, for example, and without limitation, Wi-Fi, Bluetooth, near field communication (NFC), and the like without a separate medium.

In FIG. 1, the electronic apparatus has been shown in plurality 100-1 to 100-n, but the plurality of electronic apparatuses may not be used necessarily and one apparatus may be used. In an example, the electronic apparatuses 100-1 to 100-n may be implemented as apparatuses of various forms such as, for example, and without limitation, a smartphone, a tablet, a game player, a PC, a laptop PC, a home server, a kiosk, and the like, and implemented in the form of a home appliance applied with IoT function in addition thereto.

A user may input various information through the electronic apparatuses 100-1 to 100-n that he or she uses. Input information may be stored in the electronic apparatuses 100-1 to 100-n itself, but may be transmitted to and stored in an external apparatus for reasons such as storage capacity and security. In FIG. 1, the first server apparatus 200 may perform a role of storing such information, and the second server apparatus 300 may perform a role of using a portion or all of the information stored in the first server apparatus 200.

Each of the electronic apparatuses 100-1 to 100-n may carry out homomorphic encryption on the input information, and transmit a homomorphic ciphertext to the first server apparatus 200.

Each of the electronic apparatuses 100-1 to 100-n may include encryption noise, that is, an error which is computed in a process of performing homomorphic encryption in the ciphertext. For example, the homomorphic ciphertext generated from each of the electronic apparatuses 100-1 to 100-n may be generated in a form in which a result value including a message and an error value is restored when performing decryption using a secret key thereafter.

In an example, the homomorphic ciphertext generated from the electronic apparatuses 100-1 to 100-n may be generated to a form which satisfies properties as shown below when carrying out decryption using the secret key.

$$\text{Dec}(ct, sk) = \langle ct, sk \rangle = M + e \pmod{q} \quad \text{[Equation 1]}$$

Here, $\langle, \rangle$ denotes a usual inner product, ct denotes a ciphertext, sk denotes a secret key, M denotes a plaintext message, e denotes an encryption error value, and mod q denotes a modulus of a ciphertext. q is to be selected greater than M which is a result value obtained by a scaling factor ($\Delta$) being multiplied to a message. If an absolute value of error value e is sufficiently smaller compared to M, a decryption value M+e of the ciphertext may be a value which can substitute an original message from a significant numeric operation to a same degree of precision. An error from among decrypted data may be arranged at a least significant bit (LSB) side, and M may be arranged at a second least significant bit side.

If a size of a message to too small or too great, the size may be adjusted using the scaling factor. If the scaling factor is used, because not only a message in an integer number form but even a message in a real number form may be encrypted, utilization may be greatly increased. In addition, by adjusting the size of the message using the scaling factor, regions in which messages are present in the ciphertext after an operation is carried out, that is, the size of the effective region may also be adjusted.

According to an embodiment, ciphertext modulus q may be used set to various forms. In an example, the modulus of the ciphertext may be set to an exponentiation $q = \Delta^L$ form of scaling factor $\Delta$. If $\Delta$ is 2, the above may be set to a value such as $q = 2^{10}$.

In another example, the ciphertext modulus may be set to a value obtained by multiplying a plurality of different scaling factors. Each of the factors may be set to a value within a similar range, that is, to a value of a similar size from one another. For example, the above may be set as $q = q1\, q2\, q3 \ldots qx$, and each of $q1, q2, q3, \ldots, qx$ may be similar size with the scaling factor $\Delta$ and may be set to a relatively prime value.

If the scaling factor is set in this method, a whole operation may be separated and carried out into a plurality of modulus operations according to a Chinese Remainder Theorem (CRT) and thereby, a burden of operation may be reduced.

The first server apparatus 200 may store the received homomorphic ciphertext in a ciphertext state without decrypting.

The second server apparatus 300 may request a specific processing result of the homomorphic ciphertext to the first server apparatus 200. The first server apparatus 200 may transmit, after performing a specific operation according to the request of the second server apparatus 300, the result to the second server apparatus 300. Here, the specific operation may be not only general operations such as additions and homomorphic multiplications of a plurality of homomorphic ciphertexts, but may also be statistical operations such as, for example, and without limitation, operations such as averages, frequency distributions, linear regression, covariance, and the like.

At this time, the second server apparatus 300 may perform a combining operation of the plurality of homomorphic ciphertexts.

In an example, if ciphertexts $ct_1$, and $ct_2$ transmitted by two electronic apparatuses 100-1 and 100-2 are stored in the first server apparatus 200, second server apparatus 300 may request a value obtained by summing information provided from the two electronic apparatuses 100-1 and 100-2 to the first server apparatus 200. The first server apparatus 200 may transmit, after performing an operation of summing the two ciphertexts according to a request, the result value ($ct_1 + ct_2$) to the second server apparatus 300.

Based on properties of the homomorphic ciphertext, the first server apparatus 200 may perform an operation while in a state without decryption being carried out, and the result value may also be in ciphertext form. At this time, the first server apparatus 200 may perform bootstrapping of the operation result.

The first server apparatus 200 may transmit an operation result ciphertext to the second server apparatus 300. The second server apparatus 300 may decrypt the received operation result ciphertext and obtain an operation result value of data included in each of the homomorphic ciphertexts. Then, the first server apparatus 200 may perform operations several times according to a user request.

Meanwhile, in FIG. 1, encryption being performed in the first electronic apparatus and the second electronic apparatus, and decryption being performed by the second server apparatus has been shown, but is not limited thereto.

Figure 2:
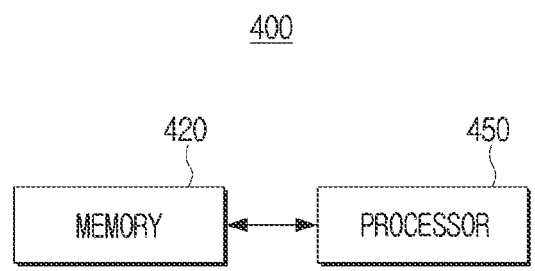
FIG. 2 is a block diagram illustrating a configuration of an operation apparatus according to one or more embodiments of the disclosure.
Figure 3:
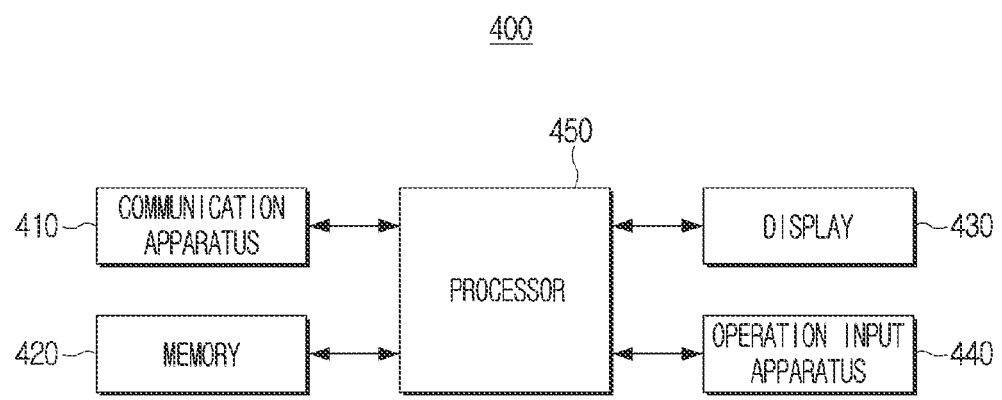
FIG. 3 is a block diagram illustrating a detailed configuration of an operation apparatus according to one or more embodiments of the disclosure.

FIG. 2 is a block diagram illustrating a configuration of an operation apparatus 400 according to one or more embodiments of the disclosure, and FIG. 3 is a block diagram illustrating a detailed configuration of the operation apparatus 400 according to one or more embodiments of the disclosure.

Specifically, in the system of claim 1, an apparatus performing homomorphic encryption such as the first electronic apparatus and the second electronic apparatus, an apparatus operating the homomorphic ciphertext such as the first server apparatus, an apparatus decrypting the homomorphic ciphertext such as the second server apparatus, and the like may be referred to as an operation apparatus. The above-described operation apparatus may be various apparatuses such as, for example, and without limitation, a personal computer (PC), a notebook, a smartphone, a tablet, a server, and the like.

Referring to FIG. 2 and FIG. 3, the operation apparatus 400 may include a communication apparatus 410, a memory 420, a display 430, an operation input apparatus 440, and a processor 450.

The communication apparatus 410 may be formed to connect the operation apparatus 400 with an external apparatus (not shown), and may be not only in a form which can be connected with the external apparatus through a local area network (LAN) and an internet network, but also in a form connected through a universal serial bus (USB) port or a wireless communication (e.g., WiFi 802.11a/b/g/n, NFC, Bluetooth) port. The above-described communication apparatus 410 may be referred to as a transceiver.

The communication apparatus 410 may receive a public key from an external apparatus, or transmit a public key generated by the operation apparatus 400 itself to the external apparatus.

Further, the communication apparatus 410 may receive the message or the homomorphic ciphertext from the external apparatus, and transmit the generated homomorphic ciphertext or the operation result to the external apparatus.

In addition, the communication apparatus 410 may receive various parameters necessary in generating a ciphertext from the external apparatus. Meanwhile, at implementation, the various parameters may be directly received from the user through the operation input apparatus 440, which will be described below.

In addition, the communication apparatus 410 may receive a request for operation of the homomorphic ciphertext from the external apparatus, and based therefrom, the calculated result may be transmitted to the external apparatus. The operation requested therefrom may be operations such as additions, subtractions, and multiplications, and may be a comparison operation such as a matrix sum, a matrix multiplication, a matrix transformation, or a non-polynomial operation, or an alignment processing, or the like.

In the memory 420, at least one instruction for the operation apparatus 400 may be stored. For example, the memory 420 may be stored with various programs (or software) for the operation apparatus 400 to operate according to the various embodiments of the disclosure.

The memory 420 described above may be implemented in various forms such as, for example, and without limitation, a RAM or ROM, a buffer, a cache, a flash memory, a HDD, an external memory, a memory card, and the like, and is not limited to any one of the above.

The memory 420 may store a message to be encrypted. Here, the message may be various credit information variously cited by users, private information, or the like, and may be information associated with use history, and the like such as, for example, and without limitation, position information used in the operation apparatus 400, internet use time information, or the like.

Further, the memory 420 may store the public key, and in case the operation apparatus 400 is an apparatus which directly generated the public key, not only a secret key, but also the public key and various parameters necessary in the generation of the secret key may be stored.

Further, the memory 420 may store the operation result of the matrix multiplication generated in a process, which will be described below. Further, the memory 420 may store the homomorphic ciphertext transmitted from the external apparatus. In addition, the memory 420 may store the operation result ciphertext, which is a result product from an operation process, which will be described below.

The memory 420 may store a learning model. The learning model may be trained using the homomorphic ciphertext, and a matrix operation may be used in an operation process of the learning model.

The display 430 may display a user interface window for a function supported by the operation apparatus 400 to be selected. For example, the display 430 may display the user interface window for various functions provided by the operation apparatus 400 to be selected. The above-described display 430 may be a monitor such as, for example, and without limitation, a liquid crystal display (LCD), an organic light emitting diodes (OLEDs), and the like, and may be implemented as a touch screen capable of simultaneously performing the functions of the operation input apparatus 440, which will be described below.

The display 430 may display a message requesting input of a parameter necessary in generating the secret key and the public key. Further, the display 430 may display a message of a subject of encryption selecting the message. Meanwhile, the subject of encryption may be directly selected by the user or automatically selected at implementation. That is, private information which requires encryption and the like may be automatically set even if the user does not directly select the message.

The operation input apparatus 440 may receive input of a function selection of the operation apparatus 400 or a control command for the corresponding function from the user. For example, the operation input apparatus 440 may receive input of the parameter necessary in generating the secret key and the public key from the user. In addition, the operation input apparatus 440 may receive setting of the message to be encrypted from the user.

Further, the operation input apparatus 440 may receive input of an operation command, or receive selection of a matrix of a ciphertext which is the subject of operation.

The processor 450 may control the overall operation of the operation apparatus 400. For example, the processor 450 may control the overall operation of the operation apparatus 400 by executing at least one instruction stored in the memory 420. The above-described processor 450 may be configured as a signal apparatus such as a central processing unit (CPU) and an application-specific integrated circuit (ASIC), or may be configured as a plurality of apparatuses such as the CPU and a graphics processing unit (GPU).

When the message to be transmitted is input, the processor 450 may store the message in the memory 420. Further, the processor 450 may use various setting values and programs stored in the memory 420, and perform homomorphic encryption on the message. In this case, the public key may be used.

The processor 450 may use the public key necessary in performing encryption by generating on its own, or use the public key received from the external apparatus. In an example, the second server apparatus 300 which performs decryption may distribute the public key to other apparatuses.

An operation in which the homomorphic ciphertext input from each of the electronic apparatuses is matrix multiplication operated will be described below.

In order to perform model learning on the encrypted data to protect private information, matrix multiplication in an encrypted state may be performed, but to perform matrix multiplication on the above-described encrypted data, a transpose operation is necessary.

For example, assuming that a gradient descent is used for the training of models such as logistic regression, linear regression, and multilayer perceptron, the transpose operation is to be essentially carried out for the training of models. However, the transpose operation in the encrypted state requires spending of too much time.

Accordingly, in the disclosure, a matrix multiplication algorithm capable of effectively performing a matrix multiplication operation of an encrypted matrix may be provided for training machine learning of homomorphic encryption. That is, the disclosure may provide a DiagABT algorithm which calculates A*B^T matrix multiplication and a DiagATB algorithm which calculates A^T*B matrix multiplication on encrypted matrices A, and B, and perform the matrix multiplication operation on matrix A and matrix B without the transpose operation by using the algorithms described above.

If the plurality of homomorphic ciphertexts are input through the communication apparatus 410, the processor 450 may encode each matrix of the homomorphic ciphertext to one or multiple blocks by using a row-major method.

The number of encoded blocks may vary according to a size of the input matrix and a size of a predetermined unit matrix. To this end, assuming that the encrypted two matrices A, and B are $A \in \mathbb{R}^{a \times b}$ and $B \in \mathbb{R}^{c \times b}$, processor 450 may determine a unit matrix in $s_0 \times s_1$ form.

Here, a denotes a row of a predetermined size for matrix A, b denotes a column of a predetermined size for matrix A, and c denotes a row of a predetermined size for matrix B. In addition, $s_0$ denotes a size of a row of the unit matrix, and $s_1$ denotes a size of a column of the unit matrix. At this time, $s=s_0 s_1$ may be same as a number of slots of a single ciphertext.

First, the matrix multiplication operation will be described assuming that each matrix is configured as a single block such as a single message or a single ciphertext according to one or more embodiments of the disclosure.

FIG. 4 is a diagram illustrating an encoding matrix of a single block according to one or more embodiments of the disclosure.

Referring to FIG. 4, if matrix A 411 is configured as a single block to satisfy $a \leq s_0$ and $b \leq s_1$, the processor 450 may apply zero padding to a right end and a lower part of the matrix A 411 from the unit matrix 412, and encode as one block using the row-major method. Here, a denotes a size of a row for the matrix A 411, and b denotes a size of a column for matrix A 411.

For example, as in FIG. 4, if the matrix A 411 is 3×3 matrix (a=b=3), and the unit matrix 412 is 4×4 matrix ($s_0=s_1=4$), it may be verified that the zero padding is applied to a fourth column at a right end and a fourth row at lower part which remain after the matrix A 411 is filled in the unit matrix 412.

An encoding matrix <A> of which the matrix $A = (a_{ij})_{0 \leq i,j < 3}$ 411 applied with zero padding is encoded in the row-major method may be shown as below.

$$\langle A \rangle = (a_{00}, a_{01}, a_{02}, 0, a_{10}, a_{11}, a_{12}, 0, a_{20}, a_{21}, a_{22}, 0, 0, 0, 0, 0)$$

Figure 5:
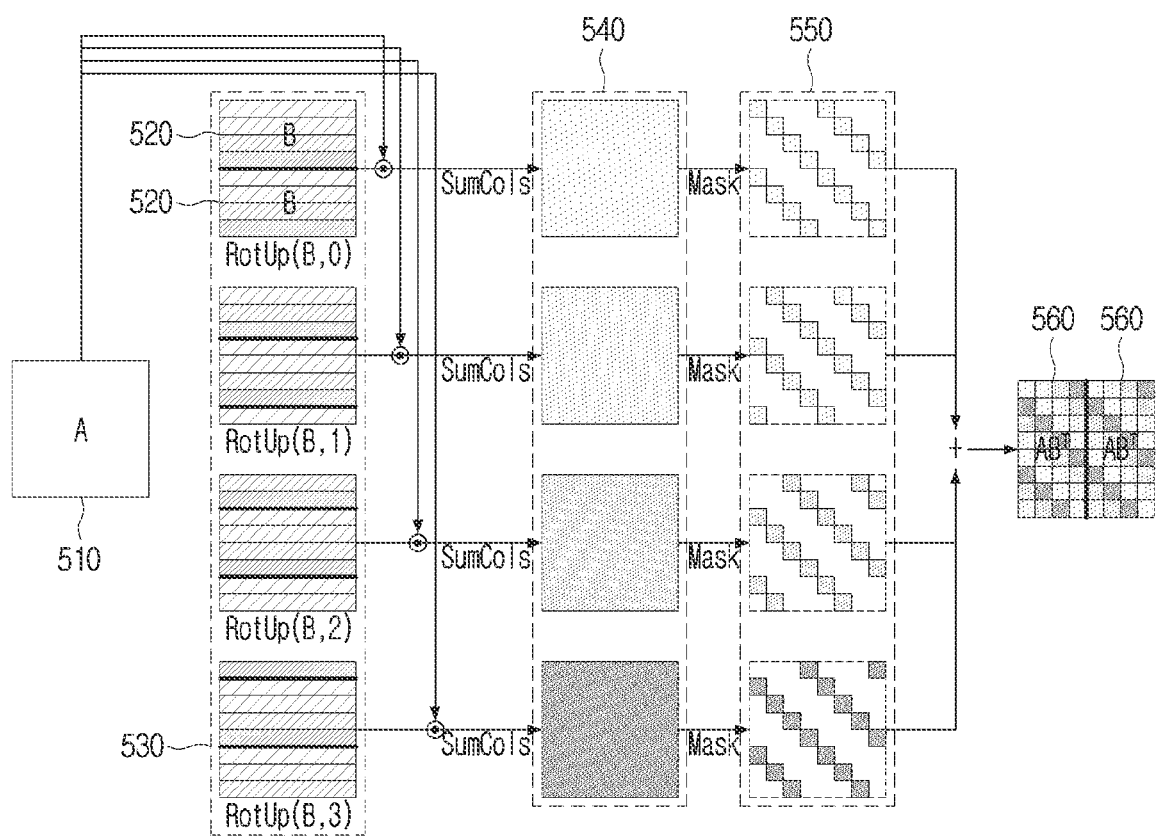
FIG. 5 is a diagram illustrating a DiagABT according to one or more embodiments of the disclosure.

FIG. 5 is a diagram illustrating a DiagABT according to one or more embodiments of the disclosure, and FIG. 6 is a diagram illustrating a DiagABT according to one or more embodiments of the disclosure. That is, FIG. 5 is a diagram illustrating a process of performing an $AB^T$ matrix multiplication according to one or more embodiments of the disclosure, and FIG. 6 illustrates an algorithm for performing an $AB^T$ matrix multiplication according to one or more embodiments of the disclosure.

The processor 450 may calculate $AB^T \in \mathbb{R}^{a \times c}$ using a basic homomorphic encryption (HE) operation such as addition, multiplication, and rotation for the matrix multiplication of the homomorphic encryption for encrypted two matrices $A \in \mathbb{R}^{a \times b}$ and $B \in \mathbb{R}^{c \times b}$.

Here, a denotes a row of a predetermined size, b denotes a column of a predetermined size, and c denotes a size of a row for the matrix B.

The processor 450 may perform encoding on matrix A, and generate first matrix data 510 having a row (a) of a predetermined size and a column (b) of a predetermined size. The processor 450 may perform encoding on matrix B, and generate second matrix data 520 having a row (c) which is 1/n size of a predetermined column (b) and column (b) of a predetermined size. Here, n may be a natural number. In the disclosure, a description may be provided on the basis that n is 2 for convenience of description.

For example, referring to FIG. 5, an encoding matrix A 510 having an 8×8 matrix size by encoding the encrypted matrix A may be generated, and an encoding matrix B 520 having a 4×8 matrix size by encoding the matrix B may be generated.

The processor 450 may arrange a plurality of rows of the second matrix data 520 sequentially in a predetermined row order twice, and generate a plurality of third matrix data 530 having a row which is a size of a predetermined column and a column of a predetermined size.

In FIG. 5, the encoding matrix B 520 may verify that the size of the row for matrix multiplication has a size half of a column of the encoding matrix A 510 so as to correspond to the column of the encoding matrix A 510, and is sequentially arranged twice in the predetermined row order. That is, the encoding matrix B 520 may have a row of a size which is same as the column of the encoding matrix A 510 by being arranged in a vertical direction by two each. However, if n is 3, that is, if a row of the encoding matrix B has a size ⅓ of a column of matrix A, a plurality of third matrix data may be generated to have a row of a size which is same as the column of the encoding matrix A by arranging the encoding matrix B in the vertical direction by three each.

The processor 450 may perform, as shown in FIG. 5 and FIG. 6, a RotUp(B, k) operation on the encoding matrix B 520 for sequentially arranging the encoding matrix B 520 in the predetermined row order. RotUp(B, k) denotes a row rotation operation which rotate each row sequentially in an upward direction by k in the encoding matrix B 520. A third matrix data (B') 530 obtained through the RotUp(B, k) operation result may be represented as shown in [Equation 2] below.

$$B'_{i,j} = B_{(i+k) \bmod c, j} \quad \text{[Equation 2]}$$

At this time, assuming that the encoding matrix B 520 is encoded in a row direction, RotUp(B, k) may be obtained by applying a left rotation to the encoding matrix B 520 by index kb, and may be represented as shown in [Equation 3] below.

$$\text{RotUp}(B, k) = \text{Lrot}(B, kb) \quad \text{[Equation 3]}$$

Next, the processor 450 may generate a plurality of fourth matrix data performed with the homomorphic multiplication operation between same rows and same columns using the first matrix data 510 and the generated plurality of third matrix data 530, respectively. That is, the processor 450 may perform matrix multiplication on the encoding matrix A 510 and a third matrix data (Bk) 530 operated through the RotUp(B, k), respectively.

The processor 450 may generate a plurality of fifth matrix data 540 in which each of a plurality of column values in a row has data homomorphically added with the plurality of column values of the corresponding row on a row basis of each of the plurality of fourth matrix data. That is, the processor 450 may perform, when a matrix multiplication result of the encoding matrix A 510 and the third matrix data (Bk) 530 is matrix X which is the $s_0 \times s_1$ matrix, a SumCols (X) operation on matrix X.

SumCols(X) denotes a sum of columns present in each row in matrix X, and may be represented as in [Equation 4] below. The SumCols(X) may be calculated with 2 log $s_1$ rotation and one constant multiplication $$\text{SumCols}(X)_{i,j} = \sum_{0 \leq k < s_1} X_{i,k} \quad \text{[Equation 4]}$$

In addition, the processor 450 may reduce complexity in calculation by using tiling, off-diagonal masking, and complexification in the matrix multiplication operation.

In FIG. 6, matrix $\overline{B}$ may be defined as $s_0 \times b$ matrix, and denote a ($s_0/c$) copy of the encoding matrix B which is tiled in the vertical direction. As described above, $s_0$ denotes a row of a predetermined size for the unit matrix, and c denotes a row of a predetermined size for the encoding matrix B. $B_{cplx}$ which is complexification of matrix may be represented as in [Equation 5] below.

$$\overline{B}_{cplx} = \overline{B} \sqrt{-1} \text{RotUp}(\overline{B}, c/2) \quad \text{[Equation 5]}$$

Here, multiplying $i = \sqrt{-1}$ as in [Equation 5] may refer to not consuming a multiplicative depth for bootstrapping of the ciphertext.

The processor 450 may generate a matrix multiplication operation result for the encoding matrix A 510 and the encoding matrix B 520 by applying a predetermined mask 550 to each of the generated plurality of fifth matrix data 540. That is, the processor 450 may operate matrix multiplication $A\overline{B}^T$ by applying the predetermined mask 550 to each of the generated plurality of fifth matrix data 540.

As shown in FIG. 5, each mask 550 may be verified as having been implemented by sequentially converting masking positions so as to correspond to an arrangement position of the third matrix data 530 which is sequentially arranged in a predetermined order.

In this case, $A\overline{B}^T$ denotes a matrix which includes a ($s_1/c$) copy of $AB^T$ in a horizontal direction, and may be represented as in [Equation 6] below. Here, $s_1$ denotes a column of a predetermined size for the unit matrix.

$$A\overline{B}^T = X + \text{Conj}(X) \quad \text{[Equation 6]}$$

Here, $$X = \sum_{0 \leq k < c/2} \text{SumCols}\left(A \odot \text{RotUp}(\overline{B}_{cplx}, k)\right) \odot M_{cplx}^{(k,c)},$$

and $M^{(k,c)}$ denotes an off-diagonal masking matrix having an entry as shown in [Equation 7] below.

$$M^{(k,c)}_{i,j} = \begin{cases} 1 & j \equiv i + k \pmod{c} \\ 0 & \text{otherwise} \end{cases} \quad \text{[Equation 7]}$$

In addition, $M_{cplx}^{(k,c)}$ may be a complexification version of masking matrix $M^{(k,c)}$, and may be represented as in [Equation 8] below.

$$M_{cplx}^{(k,c)} = \frac{1}{2} M^{(k,c)} - \frac{\sqrt{-1}}{2} M^{(k+c/2,c)} \quad \text{[Equation 8]}$$

In this case, Conj(X) denotes an operation which outputs a complex conjugate of input value (X). For example, if a complex number X is =a+bi (wherein, a, b are real numbers), Conj(X) may output a−bi which is a complex conjugate of X.

A number of rotations may become a bottleneck phenomenon of an operation in a matrix multiplication, but tiling may reduce the number of rotations from $O(s_0 \log s_1)$ to $O(c \log s_1)$. In addition, the complexification may reduce the complexity of the matrix to half.

The processor 450 may calculate, by substituting a diagonal mask $M_{cplx}^{(k,c)}$ with $tM_{cplx}^{(k,c)}$ as shown in FIG. 6, $tAB^T$ for $t \in R$ without adding the multiplicative depth.

Referring to FIG. 5, it can be verified that ultimately two $AB^T$ matrices 560 are generated through the matrix multiplication operation result.

Figure 7:
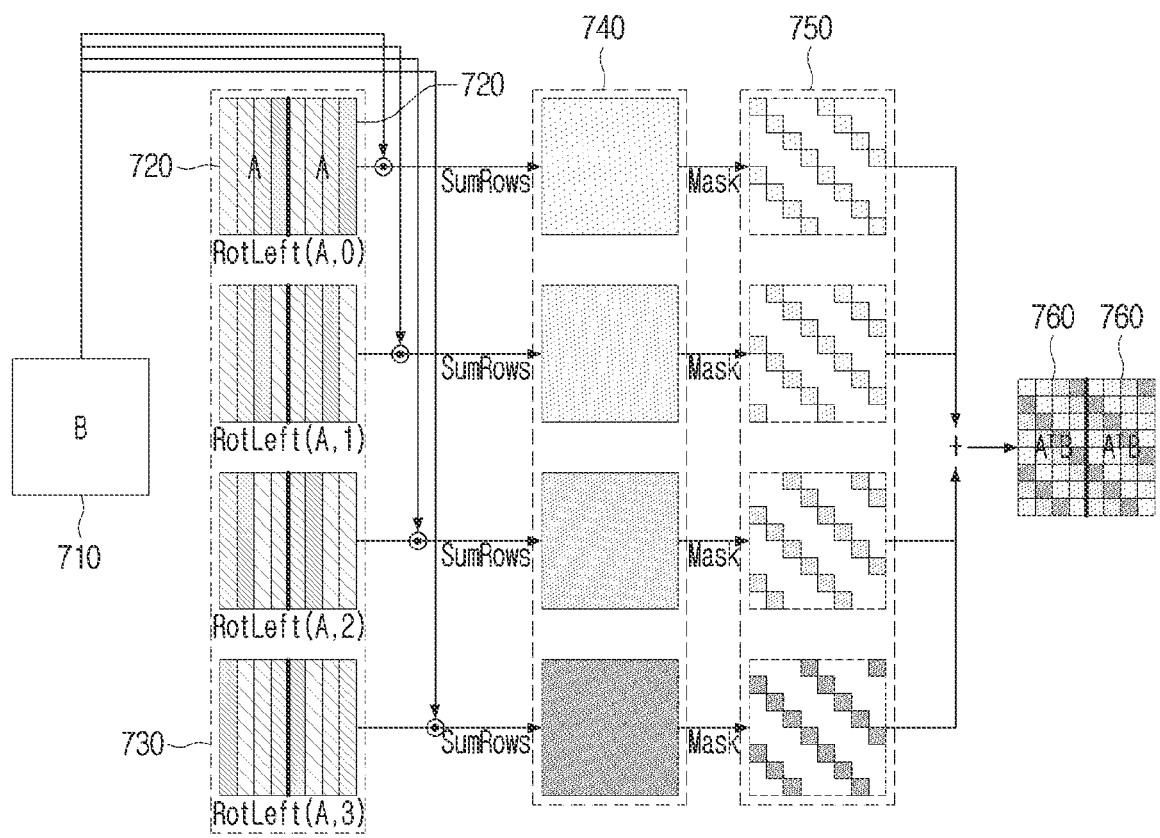
FIG. 7 is a diagram illustrating a DiagATB according to one or more embodiments of the disclosure.

FIG. 7 is a diagram illustrating a DiagATB according to one or more embodiments of the disclosure, FIG. 8 is a diagram illustrating a DiagATB according to one or more embodiments of the disclosure, and FIG. 9 is a diagram illustrating a RotLeft(A, k) operation shown in FIG. 7 and FIG. 8. That is, FIG. 7 is a diagram illustrating a process of performing an $A^TB$ matrix multiplication according to one or more embodiments of the disclosure, and FIG. 8 shows an algorithm for performing the $A^TB$ matrix multiplication according to one or more embodiments of the disclosure.

The processor 450 may calculate $A^TB$ using the basic homomorphic encryption (HE) operation such as addition, multiplication, and rotation for the encrypted two matrices $A \in \mathbb{R}^{a \times c}$ and $B \in \mathbb{R}^{a \times b}$.

Here, a denotes a row of a predetermined size, b denotes a column of a predetermined size, and c denotes a size of a column for the matrix A.

The processor 450 may perform encoding on matrix B, and generate first matrix data 710 having a row (a) of a predetermined size and a column (b) of a predetermined size. In addition, the processor 450 may perform encoding on matrix A, and generate second matrix data 720 having a row (a) of a predetermined size and a column which is 1/n size of a predetermined row (a). Likewise, n may be a natural number. In addition, a description may be provided on the basis that n is 2 for convenience of description.

For example, referring to FIG. 7, an encoding matrix B 710 having an 8×8 matrix size by encoding the encrypted matrix B may be generated, and an encoding matrix A 720 having a 8×4 matrix size by encoding the matrix A may be generated.

The processor 450 may arrange a plurality of columns of the second matrix data 720 sequentially in a predetermined column order twice, and generate a plurality of third matrix data 730 having a row (a) of a predetermined size and a column (b) of a predetermined size.

In FIG. 7, the encoding matrix A 720 may verify that the size of the column for matrix multiplication has a size half of a row of the encoding matrix B 710 so as to correspond to the row of the encoding matrix B 710, and is sequentially arranged twice in the predetermined column order. That is, the encoding matrix A 720 may have a column of a size which is same as the row of the encoding matrix B 710 by being arranged in the horizontal direction by two each. However, if n is 3, that is, if a column of the encoding matrix A has a size ⅓ of a row of matrix B, a plurality of third matrix data may be generated to have a column of a size which is same as the row of the encoding matrix B by arranging the encoding matrix A in the horizontal direction by three each.

The processor 450 may perform, as shown in FIG. 7 and FIG. 8, a RotLeft(A, k) operation on the encoding matrix A 720 for sequentially arranging the encoding matrix A 720 in the predetermined column order. RotLeft(A, k) denotes a column rotation operation which rotate each column sequentially in a left direction by k in the encoding matrix A 720 as shown in FIG. 9. A third matrix data (A') 730 obtained through the RotLeft(A, k) operation result may be represented as shown in [Equation 9] below.

$$A'_{i,j} = A_{i,(j+k) \bmod c} \quad \text{[Equation 9]}$$

At this time, the RotLeft(A, k), unlike the above-described RotUp(B, k) may consume the multiplicative depth for boot strapping.

The processor 450 may generate a plurality of fourth matrix data performed with the homomorphic multiplication operation between same rows and same columns using the generated plurality of third matrix data 730, respectively, and the first matrix data 710. That is, the processor 450 may perform matrix multiplication on a third matrix data 730 operated through the RotLeft(A, k), respectively, and the first matrix data 710.

Next, the processor 450 may generate a plurality of fifth matrix data 740 in which each of a plurality of row values in a column has data homomorphically added with the plurality of row values of the corresponding column on a column basis of each of the plurality of fourth matrix data. That is, the processor 450 may perform, when a matrix multiplication result of the third matrix data 730 and first matrix data 710 is matrix X which is the $s_0 \times s_1$ matrix, a SumRows(X) operation on matrix X.

SumRows(X) may denote a sum of rows present in each column in the matrix X, and may be represented as in [Equation 10] below. The processor 450 may calculate the SumRows(X) without additional consumption of multiplicative depth by performing a log $s_0$ rotation.

$$SumRows(X)_{i,j} = \sum_{0 \le k < s_0} X_{k,j} \quad \text{[Equation 10]}$$

The processor 450 may apply at least one from among tiling, off-diagonal masking, and complexification to reduce complexity in calculation of DiagATB. In FIG. 9, matrix $\underline{A}$ which is a $a \times s_1$ matrix denotes a ($s_1$/c) copy of the encoding matrix A which is tiled in the horizontal direction.

Here, $s_1$ denotes a column of a predetermined size for the unit matrix, and c denotes a column of a predetermined size for the encoding matrix A. $\underline{A}_{cplx}$ which is a complexification of matrix $\underline{A}$ may be represented as in [Equation 11] below.

$$\underline{A}_{cplx} = \underline{A} + \sqrt{-1} \text{RotLeft}(\underline{A}, c/2) \quad \text{[Equation 11]}$$

As shown in FIG. 9, because the RotLeft(A, k) consumes multiplicative depth, a multiplicative depth level of $\underline{A}_{cplx}$ may be one level smaller than $\underline{A}$. Accordingly, if a multiplicative depth level $\underline{A}$ of is smaller than a multiplicative depth level of matrix $\overline{B}$, a multiplicative depth of $\underline{A}^T B$ may be increased by one.

To solve the above-described problem, the processor 450 may perform a PRotUp operation of consuming the multiplicative depth level of matrix B rather than the multiplicative depth level of matrix A. The PRotUp operation will be described again below.

The processor 450 may generate a matrix multiplication operation result for the encoding matrix A 720 and the encoding matrix B 710 by applying a predetermined mask 750 to the generated respective fifth matrix data 740. That is, the processor 450 may perform an operation on matrix multiplication $\underline{A}^T B$ by applying the predetermined mask 750 to the generated respective fifth matrix data 740. In this case, $\underline{A}^T B$ may be represented as in [Equation 12] below.

$$\underline{A}^T B = X + Conj(X) \quad \text{[Equation 12]}$$

Here, $$X = \sum_{0 \le k < c/2} SumRows\bigl(Lrot(\underline{A}_{cplx}, k) \odot PRotUp(B, k)\bigr) \odot M_{cplx}^{(-k,a)}$$

is shown.

Tiling and complexification as with $AB^T$ may reduce the number of rotations of $A^T B$ from $O(s_1 \log s_0)$ to $O(c \log s_0)$. Meanwhile, referring to FIG. 7, it may be verified that ultimately two $A^T B$ matrices 760 have been generated through the matrix multiplication operation result.

Figure 11:
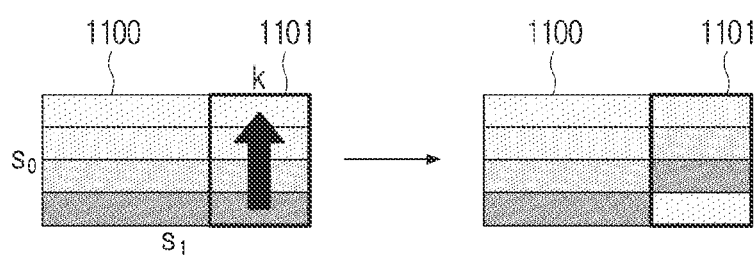
FIG. 11 is a diagram illustrating an operation of a PRotUp operation.

FIG. 10 is a diagram illustrating a PRotUp operation according to one or more embodiments of the disclosure, and FIG. 11 is a diagram illustrating an operation of a PRotUp operation. As described above, the processor 450 may use a partial rotation which is a new operation to reduce multiplicative depth in an $A^T B$ matrix multiplication operation.

Referring to FIG. 10, a PRotUp(B, k) for matrix $B \in \mathbb{R}^{a \times b}$ denotes an operation of rotating a last k column in an upward row direction by one in the encoding matrix B 710. For example, FIG. 11 shows an encoding matrix B 1100 being a 4×8 matrix, and k being 3 (k=3).

Referring to FIG. 11, it may be verified that the row rotation operation of row-rotating a row in an upward direction by one has been performed for three columns (a sixth column, a seventh column, and an eighth column) 1101 positioned at a right end from among eight columns in the encoding matrix B 1100, which is a 4×8 matrix by a PRotUp(B, 3) operation.

A matrix multiplication for when an encoding matrix is formed as multiple blocks will be described below according to one or more embodiments of the disclosure.

Figure 12:
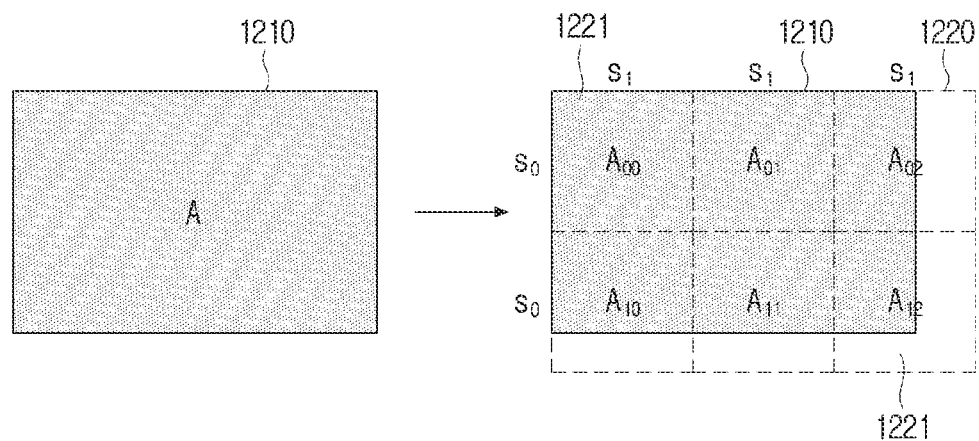
FIG. 12 is a diagram illustrating an encoding matrix of multiple blocks according to one or more embodiments of the disclosure.

FIG. 12 is a diagram illustrating an encoding matrix of multiple blocks according to one or more embodiments of the disclosure. As shown in FIG. 12, if matrix A 1210 is formed as multiple blocks to satisfy a>$s_0$ or b>$s_1$ for an encrypted matrix A∈$\mathbb{R}^{a \times b}$ 1210 and a unit matrix in $s_0 \times s_1$ form, the processor 450 may divide into submatrices 1221 in the unit matrix $s_0 \times s_1$ form so that numbers of rows and columns of an encoding block 1220 become multiples of rows and columns of the unit matrix, respectively.

In addition, the processor 450 may fill the remaining part excluding the matrix A 1210 in the divided encoding block 1220 with 0, and obtain an encoding matrix <A> for matrix A 1210 by encoding the divided respective submatrices 1221 of the encoding block 1220 in the row-major method. [Equation 13] below show the encoding matrix <A> for the matrix A 1210.

$$\langle A \rangle = \{ \langle A \rangle_{i,j} \}_{0 \leq i < \lceil a/s_0 \rceil, 0 \leq j < \lceil b/s_1 \rceil} \quad \text{[Equation 13]}$$

Here, $\langle A \rangle_{i,j}$ denotes the encoding matrix of (i, j)th submatrices 1221.

For example, referring to FIG. 12, if the encrypted input matrix A 1210 is a 13×21 matrix, and the unit matrix is an 8×8 matrix, the processor 450 may perform encoding by dividing the encoding block 1220 into six partial blocks ($A_{00}, A_{01}, A_{02}, A_{10}, A_{11}, A_{12}$).

That is, it may be verified that two unit matrices are arranged vertically so that a row of an encoding matrix is greater than 13 which is the row of the matrix A 1210 in a row direction of the encoding block 1220, and three unit matrices are arranged horizontally so that a column of an encoding matrix is greater than 21 which is the column of matrix A 1210 in a column direction of the encoding block 1220

In FIG. 12, six respective partial blocks show a matrix in which 8×8 submatrices 1221 in a unit matrix form are encoded. In addition, in the case of four partial blocks ($A_{02}, A_{10}, A_{11}, A_{12}$) in which the matrix A 1210 is not fully filled from among six blocks of the encoding block 1220, zero padding may be applied to a space which remain after the matrix A 1210 is filled as with the above-described single block.

Through the above, the operation apparatus 400 according to one or more embodiments of the disclosure may perform matrix multiplication by expanding a SumRows operation and a SumCols operation to even a large matrix which is not fully containable within one ciphertext.

Figure 13:
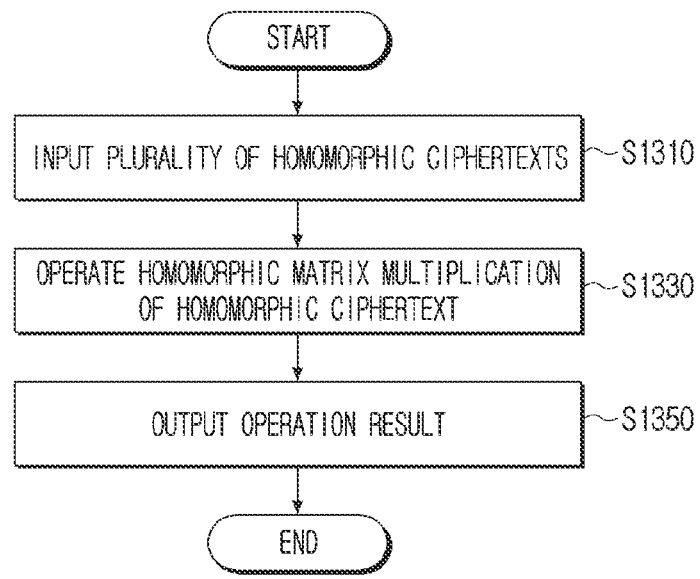
FIG. 13 and FIG. 14 are flowcharts illustrating an operation method according to one or more embodiments of the disclosure.
Figure 14:
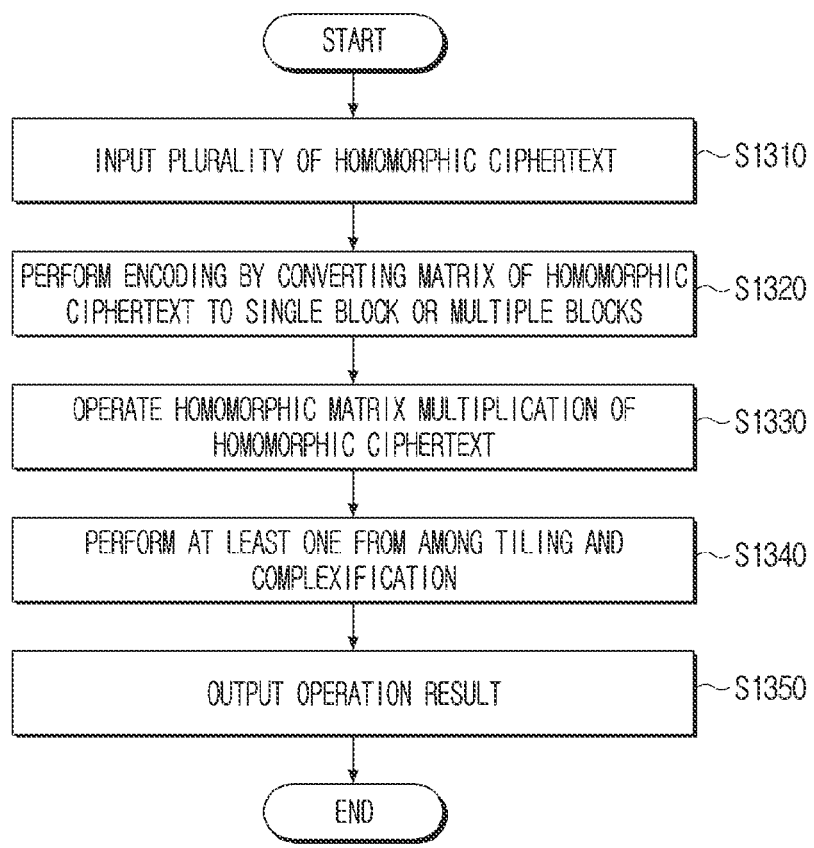
Figure 15:
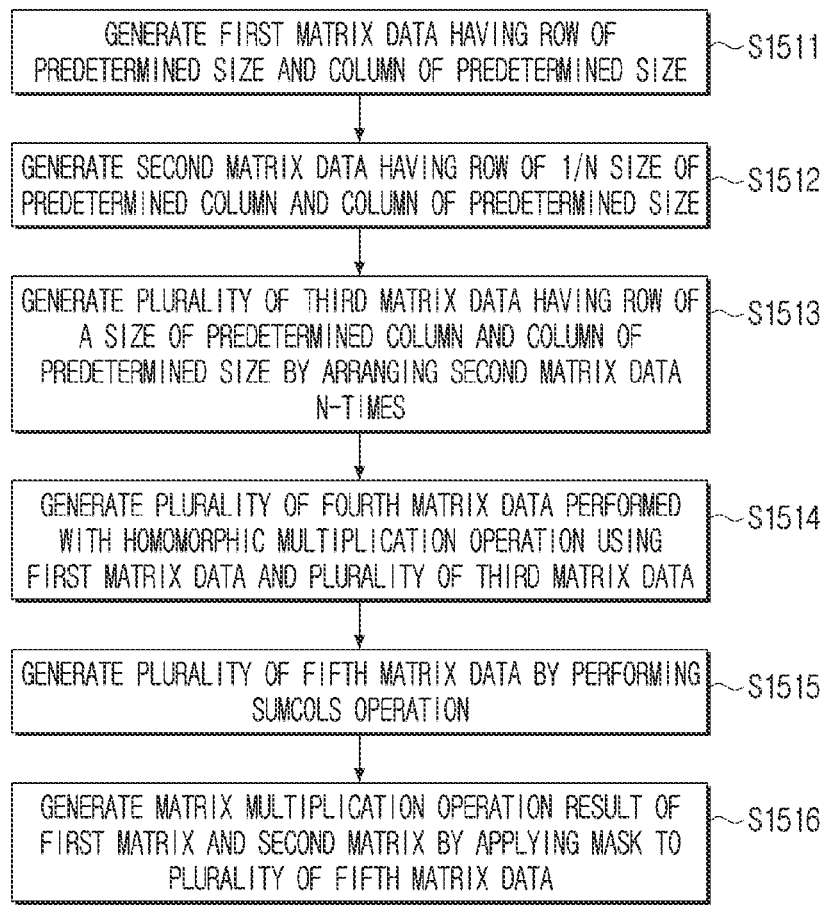
FIG. 15 and FIG. 16 are flowcharts illustrating detailed steps in operating a matrix multiplication shown in FIG. 13 and FIG. 14.
Figure 16:
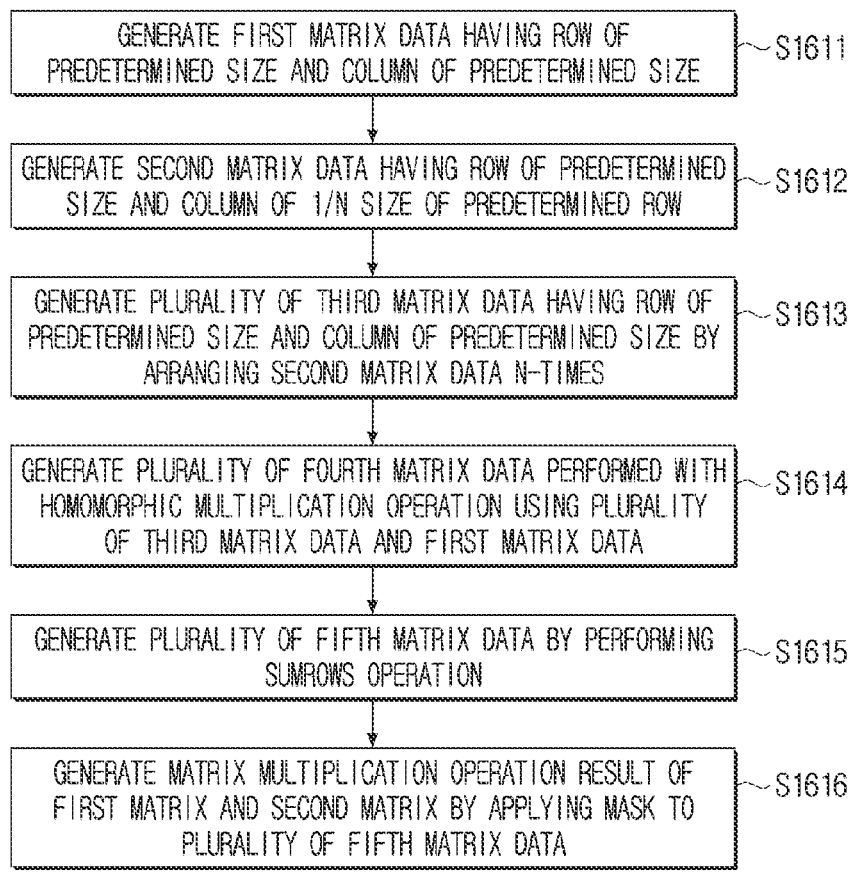

FIG. 13 and FIG. 14 are flowcharts illustrating an operation method according to one or more embodiments of the disclosure, and FIG. 15 and FIG. 16 are flowcharts illustrating detailed steps in operating a matrix multiplication shown in FIG. 13 and FIG. 14. That is, FIG. 15 shows in detail a step of operating an $AB^T$ matrix multiplication (S1331), and FIG. 16 shows in detail a step of operating an $A^T B$ matrix multiplication (S1332).

An operation method described in FIG. 13 to FIG. 16 may be performed by an operation apparatus having the configurations shown in FIG. 1 to FIG. 3, but is not necessarily limited thereto, and may be performed by an electronic apparatus having a different configuration from that of FIG. 1 to FIG. 3. In an example, the above may be performed regardless of a type thereof so long as it is an apparatus mounted with a recording medium stored in a program code for performing the operation method described above.

Referring to FIG. 13, an operation method for performing matrix multiplication of an homomorphic encryption may include receiving input of the plurality of homomorphic ciphertexts (S1310), performing the homomorphic matrix multiplication operation on the plurality of homomorphic ciphertexts (S1330), and outputting an operation result (S1350).

At this time, the performing the homomorphic matrix multiplication operation (S1330) may include generating the first matrix data having a row of a predetermined size and a column of a predetermined size using the plurality of homomorphic ciphertexts (S1511), generating the second matrix data having a row which is 1/n size of the predetermined column and the column of the predetermined size (S1512), and generating the plurality of third matrix data having a row which is the size of the predetermined column and a column of the predetermined size by arranging the plurality of rows of the second matrix data sequentially in the predetermined row order n-times (S1513) as shown in FIG. 15.

In addition, the performing the homomorphic matrix multiplication operation (S1330) may further include generating the plurality of fourth matrix data performed with the homomorphic multiplication operation between the same rows and the same columns using the first matrix data and the generated respective third matrix data (S1514), generating the plurality of fifth matrix having data in which respective column values in a row are homomorphically added with the plurality of column values of the corresponding row in a row basis of the respective fourth matrix data (1515), and generating a matrix multiplication operation result of the first matrix and the second matrix by applying a predetermined mask to the generated respective fifth matrix data (S1516).

Referring to FIG. 14, the operation method for performing the matrix multiplication of the homomorphic encryption may further include, after receiving input of the plurality of homomorphic ciphertexts (S1310), performing encoding by converting a matrix of the homomorphic ciphertext input according to a size of the homomorphic ciphertext and a predetermined size of the unit matrix to a single block or multiple blocks (S1320).

At this time, in the step of performing encoding by converting to a single block or multiple blocks (S1320), if the converted encoding block is formed as a single block, an encoding matrix may be generated by encoding the encoding block after zero padding is applied to a position which remain after data of the homomorphic ciphertext is filled in the encoding block in the unit matrix form.

Meanwhile, in the step of performing encoding by converting to a single block or multiple blocks (S1320), if the encoding block is formed as multiple blocks, a number of blocks in the encoding block may be determined according to an input matrix size of the homomorphic ciphertext and a predetermined size of the unit matrix.

For example, if the matrix A 1210 is formed as multiple blocks to satisfy a>$s_0$ or b>$s_1$ for encrypted matrix A∈$\mathbb{R}^{a \times b}$ 1210 and a unit matrix in $s_0 \times s_1$ form, the encoding block 1220 may be divided into submatrices 1221 in the unit matrix $s_0 \times s_1$ form for a number of rows and columns of the encoding block 1220 to be multiple of the rows and columns of the unit matrix, respectively, and the divided respective submatrices 1221 may be encoded in the row-major method. Because detailed descriptions associated with the encoding block described above overlap with the descriptions described in the operation apparatus 400, the detailed descriptions thereof will be omitted.

Referring to FIG. 14, the operation method for performing the matrix multiplication of the homomorphic encryption may include, after performing the homomorphic matrix multiplication operation (S1330), performing at least one from among tiling, off-diagonal masking, and complexification to reduce the complexity in calculation of matrix multiplication (S1340).

Meanwhile, referring to FIG. 16, the performing the homomorphic matrix multiplication operation (S1330) may include generating the first matrix data having a row of a predetermined size and a column of a predetermined size using the plurality of homomorphic ciphertexts (S1611), generating the second matrix data having a row of the predetermined size and a column which is 1/n size of the predetermined row (S1612), and generating the plurality of third matrix data having a row of the predetermined size and a column of the predetermined size by arranging the plurality of columns of the second matrix data sequentially in the predetermined column order n-times (S1613).

In addition, the performing the homomorphic matrix multiplication operation (S1330) may further include generating the plurality of fourth matrix data performed with the homomorphic multiplication operation between the same rows and the same columns using the generated respective third matrix data and the first matrix data (S1614), generating the plurality of fifth matrix data having data in which the respective row values in a column are homomorphically added with the plurality of row values of the corresponding columns in a column basis of the respective fourth matrix data (S1615), and generating a matrix multiplication operation result of the first matrix and the second matrix by applying the predetermined mask to the generated respective fifth matrix data (S1616).

As described above, the apparatus for calculating the matrix multiplication of the homomorphic encryption and the method thereof according to various embodiments of the disclosure has an effect of reducing time in the matrix multiplication operation by performing matrix multiplication without the transpose operation of the encrypted matrix in the model training step of the homomorphic encryption.

In addition, the apparatus for calculating the matrix multiplication of the homomorphic encryption and the method thereof according to various embodiments of the disclosure has an effect of being able to quickly perform the training of various machine leanings such as logistic regression, linear layer, and multilayer perceptron in an encrypted state.

Meanwhile, the operation method for performing the matrix multiplication of the homomorphic encryption according to the various embodiments described above may be implemented in a program code form for performing each of the steps, and stored and distributed in a recording medium. In this case, the apparatus mounted with the recording medium may perform the operations of the operation apparatus described above.

The recording medium described above may be a computer-readable medium of various types such as, for example, and without limitation, a ROM, a RAM, a memory chip, a memory card, an external hard disk drive, a hard disk drive, a CD, a DVD, a magnetic disk, or a magnetic tape.

While the disclosure has been illustrated and described with reference to example embodiments thereof, it will be understood that the disclosure is intended to be illustrative, not limiting. It will be understood by those skilled in the art that various changes in form and details may be made therein without departing from the true spirit and full scope of the disclosure, including the appended claims and their equivalents.

DESCRIPTION OF REFERENCE NUMERALS IN THE DRAWINGS

| | |
|---|---|
| 100: electronic apparatus | 200: first server apparatus |
| 300: second server apparatus | 400: operation apparatus |
| 410: communication apparatus | 420: memory |
| 430: display | 440: operation input apparatus |
| 450: processor | |

What is claimed is:

1. An operation apparatus, comprising:
a memory configured to store at least one instruction and a plurality of homomorphic ciphertexts; and
a processor configured to perform a homomorphic matrix multiplication operation on the plurality of homomorphic ciphertexts by executing the at least one instruction,
wherein the processor is configured to
generate first matrix data having a row of a predetermined size and a column of a predetermined size using the plurality of homomorphic ciphertexts,
generate second matrix data having a row which is 1/n size of the predetermined column and the column of the predetermined size,
generate a plurality of third matrix data having a row which is the size of the predetermined column and the column of the predetermined size by arranging a plurality of rows of the second matrix data sequentially in a predetermined row order n-times,
generate a plurality of fourth matrix data performed with a homomorphic multiplication operation between an $i^{th}$ row of the first matrix data and an $i^{th}$ row of each of the plurality of third matrix data,
generate a plurality of fifth matrix data having data in which respective column values in a row are homomorphically added with a plurality of column values of the corresponding row in a row basis of each of the plurality of fourth matrix data, and
generate a matrix multiplication operation result of the first matrix and the second matrix by applying a predetermined mask to each of the plurality of fifth matrix data.

2. The operation apparatus according to claim 1, wherein the processor is configured to
perform encoding by converting a matrix of a homomorphic ciphertext input according to a size of the homomorphic ciphertext and a predetermined size of a unit matrix to a single block or multiple blocks.

3. The operation apparatus according to claim 2, wherein the processor is configured to
perform, based on a converted encoding block being formed as a single block, encoding by applying zero padding to a position which remains after data of the homomorphic ciphertext is filled in the unit matrix.

4. The operation apparatus according to claim 2, wherein the processor is configured to
divide, based on a converted encoding block being formed as multiple blocks, an encoding block into submatrices in the unit matrix form for a number of rows and columns of the encoded block to be multiples of rows and columns of the unit matrix, respectively, and perform encoding of the divided respective submatrices in a row-major method.

5. The operation apparatus according to claim 1, wherein the processor is configured to perform at least one from among tiling and complexification to reduce complexity in calculation of a matrix multiplication operation.

6. The operation apparatus according to claim 1, wherein the mask is configured to sequentially convert a masking position so as to correspond to an arrangement position of the third matrix data arranged sequentially in a predetermined order.

7. An operation method for performing a matrix multiplication of a homomorphic encryption, the method comprising:

receiving input of a plurality of homomorphic ciphertexts;

performing a homomorphic matrix multiplication operation on the plurality of homomorphic ciphertexts; and outputting an operation result, wherein the performing the homomorphic matrix multiplication operation comprises generating first matrix data having a row of a predetermined size and a column of a predetermined size using the plurality of homomorphic ciphertexts;

generating second matrix data having a row which is 1/n size of the predetermined column and the column of the predetermined size;

generating a plurality of third matrix data having a row which is the size of the predetermined column and a column of the predetermined size by arranging a plurality of rows of the second matrix data sequentially in a predetermined row order n-times;

generating a plurality of fourth matrix data performed with a homomorphic multiplication operation between an $i^{th}$ row of the first matrix data and an $i^{th}$ row of each of the plurality of third matrix data;

generating a plurality of fifth matrix data having data in which respective column values in a row are homomorphically added with a plurality of column values of the corresponding row in a row basis of each of the plurality of fourth matrix data; and generating a matrix multiplication operation result of the first matrix and the second matrix by applying a predetermined mask to each of the plurality of fifth matrix data.

8. The operation method according to claim 7, further comprising:

performing, after receiving input of the plurality of homomorphic ciphertexts, encoding by converting a matrix of a homomorphic ciphertext input according to a size of the homomorphic ciphertext and a predetermined size of a unit matrix to a single block or multiple blocks.

9. The operation method according to claim 8, further comprising performing, based on a converted encoding block being formed as a single block, encoding by applying zero padding to a position which remains after data of the homomorphic ciphertext is filled in the unit matrix.

10. The operation method according to claim 8, further comprising dividing, based on a converted encoding block being formed as multiple blocks, an encoding block into submatrices in the unit matrix form for a number of rows and columns in the encoding block to be multiples of rows and columns of the unit matrix, respectively, and performing encoding of the divided respective submatrices in a row-major method.

11. The operation method according to claim 7, further comprising performing, after performing the homomorphic matrix multiplication operation, at least one from among tiling and complexification to reduce a complexity in calculation of a matrix multiplication.

12. The operation method according to claim 7, wherein the mask comprises sequentially converting a masking position so as to correspond to an arrangement position of the third matrix data which is sequentially arranged in a predetermined order.

13. A non-transitory computer-readable recording medium comprising a program for executing an operation method for performing matrix multiplication of a homomorphic encryption, the operation method comprising:

receiving input of a plurality of homomorphic ciphertexts;

performing a homomorphic matrix multiplication operation on the plurality of homomorphic ciphertexts; and outputting an operation result, wherein the performing the homomorphic matrix multiplication operation comprises generating first matrix data having a row of a predetermined size and a column of a predetermined size using the plurality of homomorphic ciphertexts;

generating second matrix data having a row which is 1/n size of the predetermined column and the column of the predetermined size;

generating a plurality of third matrix data having a row which is the size of the predetermined column and a column of the predetermined size by arranging a plurality of rows of the second matrix data sequentially in a predetermined row order n-times;

generating a plurality of fourth matrix data performed with a homomorphic multiplication operation between an $i^{th}$ row of the first matrix data and an $i^{th}$ row of each of the plurality of third matrix data;

generating a plurality of fifth matrix data having data in which respective column values in a row are homomorphically added with a plurality of column values of the corresponding row in a row basis of each of the plurality of fourth matrix data; and generating a matrix multiplication operation result of the first matrix and the second matrix by applying a predetermined mask to each of the plurality of fifth matrix data.

\* \* \* \* \*